(12) United States Patent
Wang

(10) Patent No.: US 6,704,071 B2
(45) Date of Patent: Mar. 9, 2004

(54) LIGHT GUIDE CAPABLE OF OPTICALLY CHANGING COLOR OF LIGHT

(75) Inventor: Chih-Yuan Wang, Taichung Hsien (TW)

(73) Assignee: Wintek Corporation, Taichung (TW)

( * ) Notice: Subject to any disclaimer, the term of this patent is extended or adjusted under 35 U.S.C. 154(b) by 49 days.

(21) Appl. No.: 10/061,209

(22) Filed: Feb. 4, 2002

(65) Prior Publication Data

US 2003/0147025 A1 Aug. 7, 2003

(51) Int. Cl.⁷ .............................................. G02F 1/1335
(52) U.S. Cl. .............................. 349/71; 349/65; 349/62; 362/31
(58) Field of Search .............................. 349/62, 64, 65, 349/71; 362/26, 31

(56) References Cited

U.S. PATENT DOCUMENTS

| 5,866,039 A | * | 2/1999 | Morton ................ 252/301.4 R |
| 5,995,288 A | * | 11/1999 | Kashima et al. ............. 359/599 |
| 6,280,063 B1 | * | 8/2001 | Fong et al. .................. 362/333 |
| 2003/0039113 A1 | * | 2/2003 | Murr et al. .................... 362/31 |

* cited by examiner

*Primary Examiner*—Kenneth Parker
(74) *Attorney, Agent, or Firm*—Rosenberg, Klein & Lee

(57) ABSTRACT

A light guide capable of optically changing color of light is disposed on a liquid crystal display. A lighting module having the light guide is disposed under the liquid crystal module of the display. A brightening layer and a color-changing layer are integrally disposed under a light outgoing face of the light guide. The brightening layer is composed of a number of optical particles. An outer surface of each optical particle is formed with multiple irregular projections. The color-changing layer is blended with predetermined color material.

5 Claims, 6 Drawing Sheets

LIGHT GUIDE CAPABLE OF OPTICALLY CHANGING COLOR OF LIGHT

BACKGROUND OF THE INVENTION

The present invention is related to a photoconductor cell, which not only is able to optically change color of light, but also is able to enhance the brightness of back light of a liquid crystal display.

FIG. 8 shows a conventional photoconductor module 90 applied to liquid crystal display. The photoconductor module 90 includes light-emitting diode (LED) or cold-cathode-ray tube (CCFL) as light source 91 and is used in photo-conduction technique of back light. A scattering layer 94 is connected on the light outgoing face 922 of the photoconductor cell 92. A color-changing layer 93 is laid on the scattering layer 94. A brightening layer 95 is laid on the color-changing layer 93. A reflecting layer 96 is laid under the photoconduction face 921 of the photoconductor cell 92. The reflecting layer 96 and the photoconduction face 921 serve to make the light beam emitted from the point light source or linear light source outgo from the light outgoing face 922 to the liquid crystal module 97. When reaching the scattering layer 94, the light beam is evened. Then, the light reaches the color-changing layer 93 to change the color. Accordingly, the liquid crystal module 97 can present back light with predetermined color.

In prior art, the color of the back light of the liquid crystal display without color-changing film is determined by the color of the light emitted from the light source 91. For example, when it is desired to have blue back light of the liquid crystal display, it is necessary to use a blue light source 91. When it is desired to have orange back light of the liquid crystal display, it is necessary to use an orange light source 91. Therefore, in order to have various back light colors, light sources 91 with different colors are generally used in the electronic products. However, the light sources have limited colors. Therefore, for achieving a specific color other than the color of the light source, a color-changing film 93 is necessary to optically change the color.

With respect to the back light of color liquid crystal display, the back light is desired to be white and have better brightness. However, the white light source has higher price so that light sources of blue, green, orange, red, etc. are often selected for lowering the cost. At this time, the color needs to be optically changed into white.

A conventional color-changing film 93 for optically changing the color is only blended with a specific color material to convert the color of back light. However, the color material itself will interrupt and absorb the light so that the light emitted from the light source 91 will be interrupted and the brightness of the back light will be reduced. As a result, the liquid crystal display is darkened and can be hardly clearly seen.

SUMMARY OF THE INVENTION

It is therefore a primary object of the present invention to provide a light guide capable of optically changing color of light. A brightening layer is disposed on the light guide. The brightening layer includes therein numerous optical particles, which are able to enhance the brightness of the light in perpendicular direction. Therefore, the entire brightness of the display is enhanced.

It is a further object of the present invention to provide the above light guide in which a color-changing layer is disposed on the light guide. The color-changing layer is blended with predetermined color material for changing the color of light into a predetermined color so as to achieve various colors of back light.

The present invention can be best understood through the following description and accompanying drawings wherein:

DETAILED DESCRIPTION OF THE PREFERRED EMBODIMENT

Figure 1:
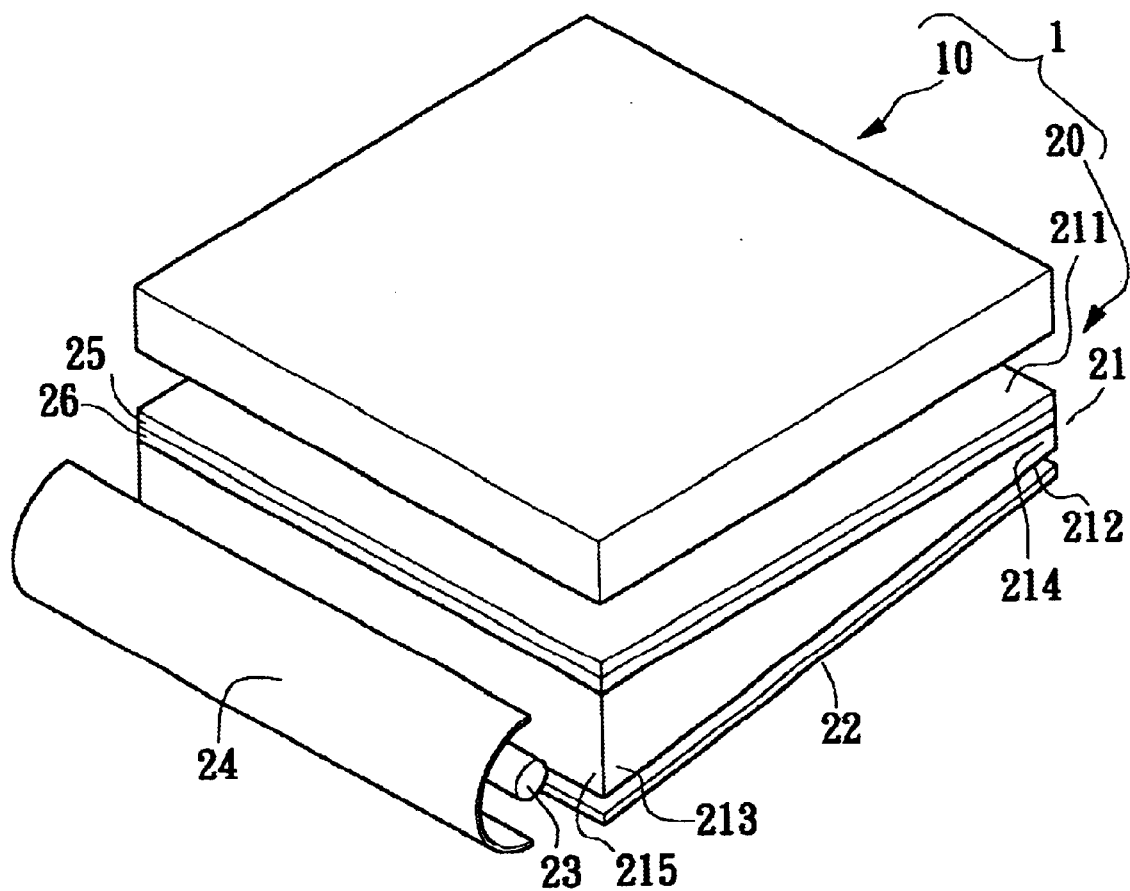
FIG. 1 is a perspective view of a first embodiment of the present invention.

Please refer to FIG. 1. According to a first embodiment, the present invention is disposed on a back light-type liquid crystal display 1 having a liquid crystal module 10. A lighting module 20 is disposed under the bottom of the liquid crystal module 10. The lighting module 20 has a light guide 21 made of transparent substrate material. The top of the light guide 21 has a light outgoing face 211. The bottom of the light guide 21 has an inclined emission surface 212, whereby the light guide 21 is tapered to have a thick end 213 and a thin end 214. A reflecting layer 22 is disposed under the light guide 21. A light incoming face 215 is formed on a lateral side of the thick end 213 of the light guide 21. A light source 23 is arranged on one side of the light incoming face 215 distal from the thin end 214 of the light guide 21. An arched reflecting mirror 24 is positioned on one side of the light source 23 distal from the light guide 21. In addition a brightening layer 25 is integrally disposed under the light outgoing face 211 of the light guide 21. The brightening layer 25 is composed of a number of optical particles 251. The optical particles 251 can be made of metal oxides (such as silicon dioxide, glass particles, titanium dioxide. etc.) or inorganic hydroxides (such as $Al_2(OH)_3$, etc.) or inorganic salts (such as sodium chloride, potassium chloride, etc.) or organic polymers. The outer surface of each optical particle 251 is formed with projections 252. In addition, a color-changing layer 26 is integrally disposed under the brightening layer 25 of the light guide 21. The color-changing layer 26 is blended with a color material or luminescent color material.

It should be noted that the projections 252 formed on the surfaces of the optical particles 251 serve to in unspecific directions reflect and spread the light beam which comes in unspecific directions, whereby the light beam is scattered. The scattered light beam makes the brightness more even and increases the light beam reflected to pass through the liquid crystal module 10 so as to enhance the illumination of the display.

Figure 7:
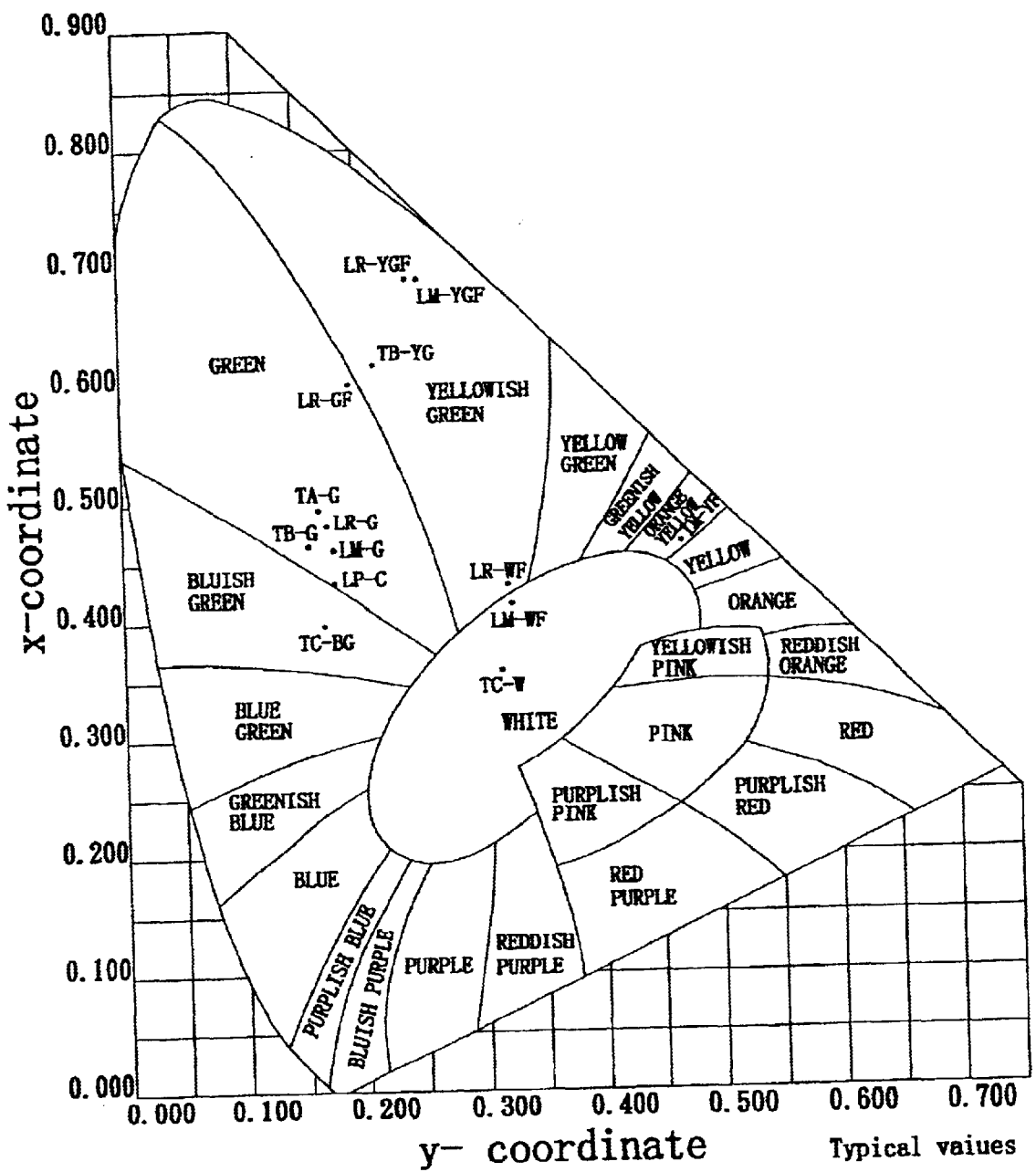
FIG. 7 is a CIE chromaticity diagram.
Figure 8:
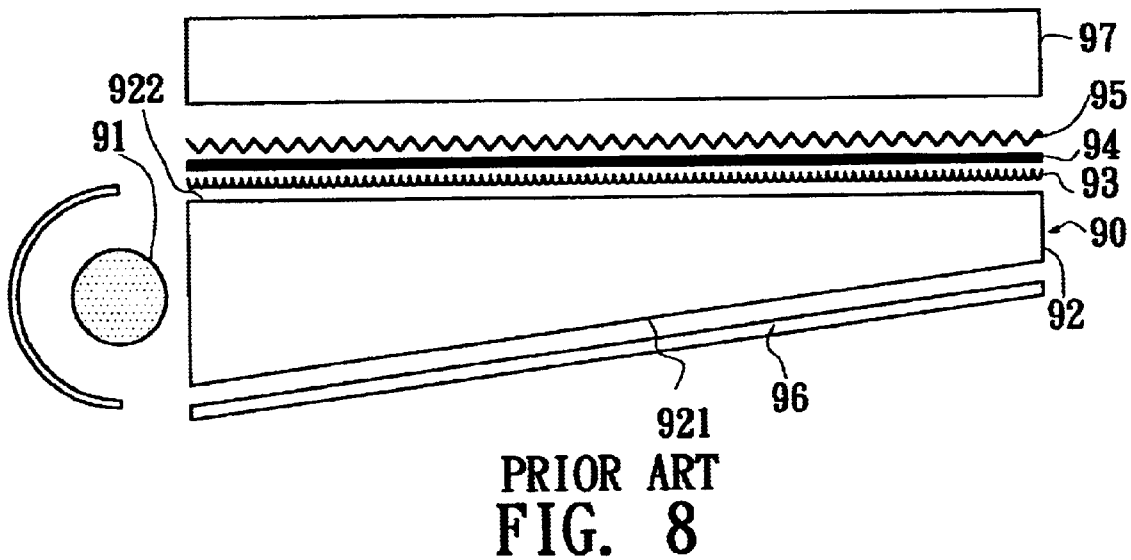
FIG. 8 shows the structure of a conventional photoconductor cell connected with a color-changing film.

Moreover, with reference to FIG. 7 which is a CIE chromaticity diagram, when it is desired to show purple back light from the liquid crystal display with a blue light source 23, a cooperative color-changing layer 26 with red color is necessary. Similarly, when it is desired to show white back light from the liquid crystal display with a blue light source 23. a cooperative color-changing layer 26 with orange color is necessary.

Figure 2:
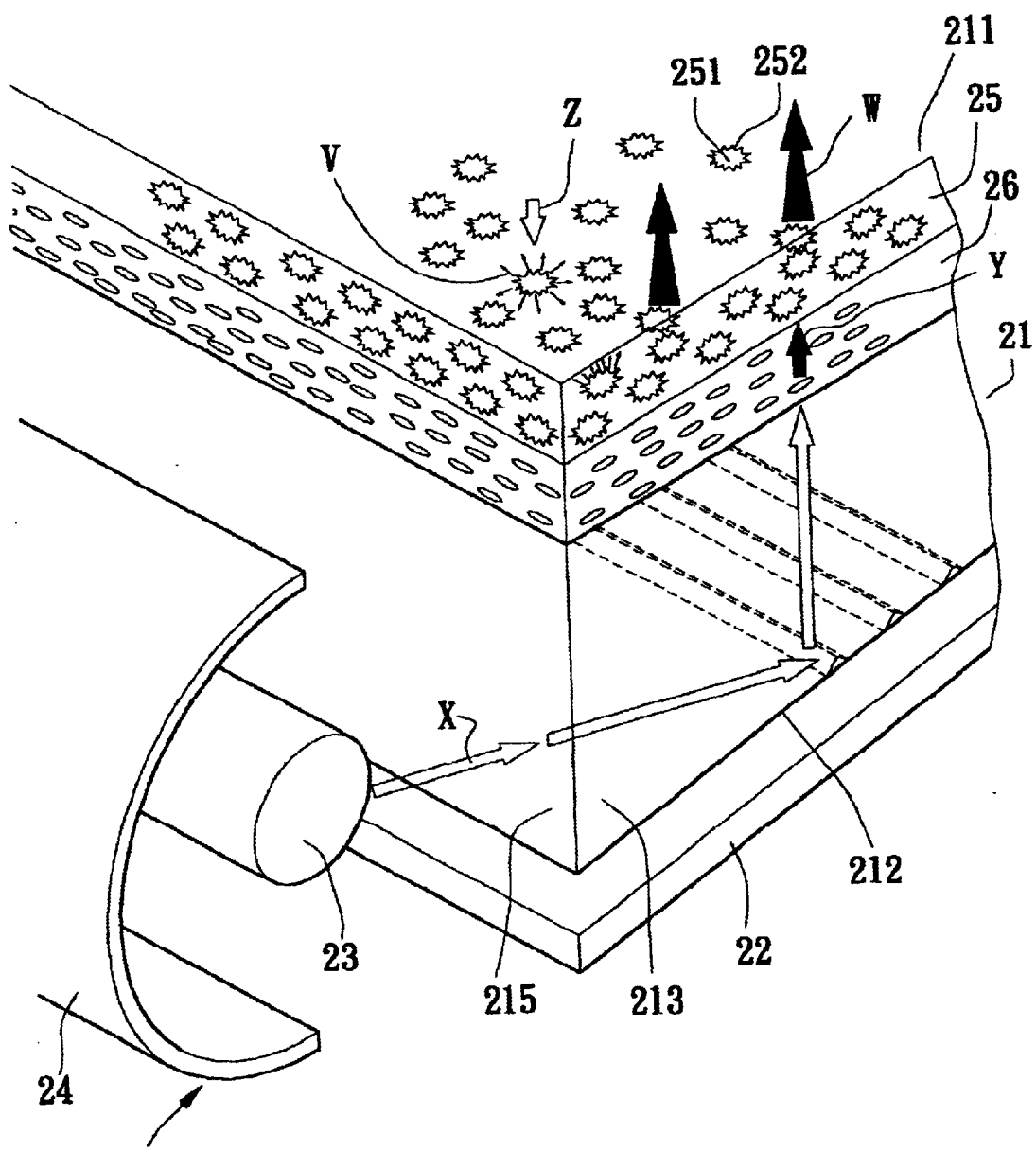
FIG. 2 is a perspective view of the first embodiment, showing the path of light beam.
Figure 3:
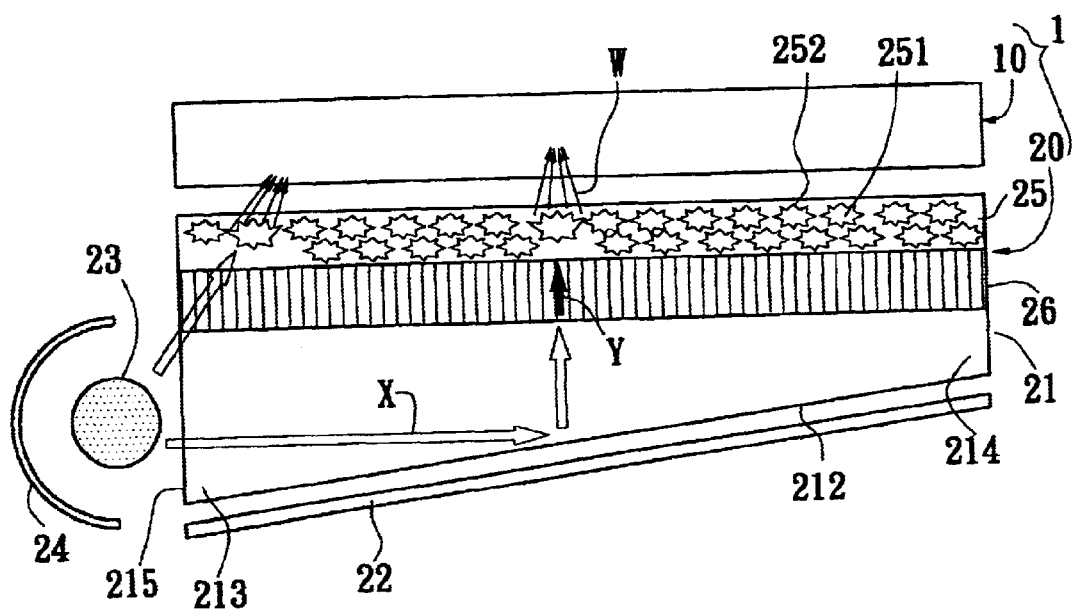
FIG. 3 is a view of the first embodiment, showing that the light beam of external light source is focused by the brightening layer to enhance the brightness.

Referring to FIG. 2, the light guide 21 of the present invention is applicable to the panel of an electronic product such as a mobile phone or a PDA. The light source 23 (which is a blue LED in this embodiment ) emits a light beam X which is directly projected to the light incoming face 215 of the light guide 21 or is reflected by the reflecting mirror 24 thereto. The light beam X is refracted to the light outgoing face 211 or is directly projected thereto. Before the light beam X penetrates through the light guide 21 from the light outgoing face 211. the light beam X first passes through the color-changing layer 26 (which in this embodiment has red color), whereby the colors are mixed to form a light Y with changed color (which is purple with reference to FIG. 3). The light Y with changed color further penetrates through the brightening layer 25. The projections 252 on the surfaces of the numerous optical particles 251 in the brightening layer 25 focus the light Y as a convex lens as shown in FIG. 3. The light Y then goes out from the upper side of the optical particles 251 to penetrate through the liquid crystal module 10. Accordingly, the liquid crystal display 1 can present back light with the changed color. The focusing effect enhances the brightness of the light so that the back light of the liquid crystal display has better brightness.

Figure 4:
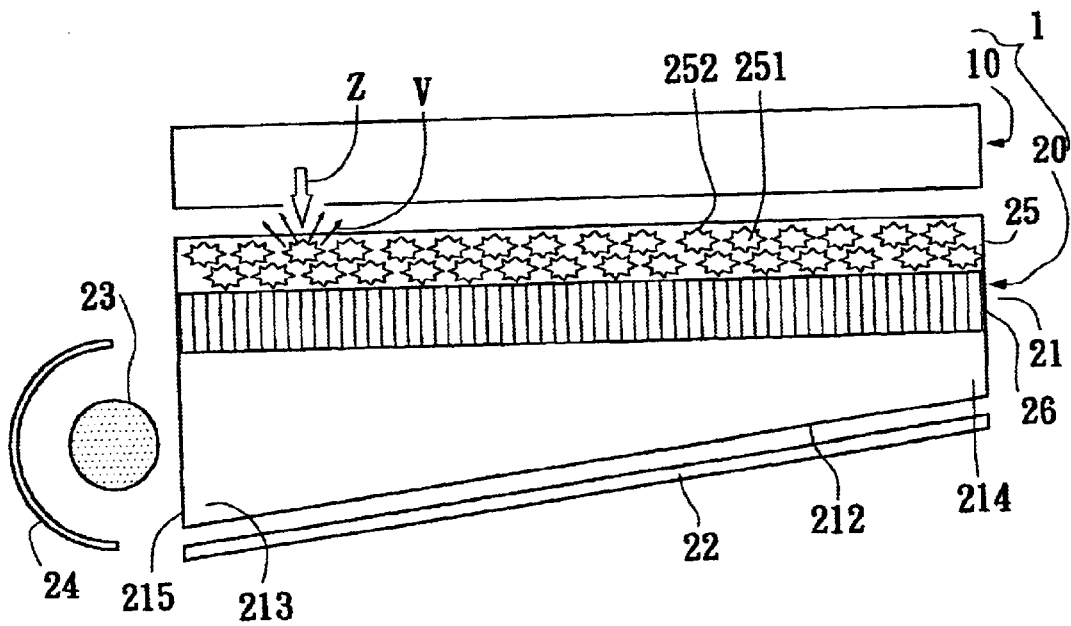
FIG. 4 is a view of the first embodiment, showing that the light beam of internal light source is scattered by the brightening layer.

In addition, the light beam Z emitted from external light source (such as sunlight or lamp light) will penetrate through the liquid crystal module 10 and reach the brightening layer 25 of the light guide 21. The light beam Z is reflected and scattered by the projections 252 on the surfaces of the numerous optical particles 251 to form scattered light V which can be reflected back to the liquid crystal module 10 (as shown in FIG. 4). This enhances the brightness and evenness presented by the liquid crystal module 10.

According to the above arrangement, the color-changing layer 26 of light guide 21 of the present invention serves to change the color of the light emitted from the light source 23. Therefore, depending on the colors of the light source 23 and the color-changing film 26, various back light colors can be achieved. Moreover, the numerous optical particles 251 of the brightening layer 25 reflects and scatters the light of external light sources and focuses the light of internal light source 23 so as to enhance the brightness and evenness presented by the liquid crystal display 1. Accordingly, while changing the color of back light, the brightness of the back light of the display 1 is also increased so that the illumination of the display 1 is enhanced.

Figure 5:
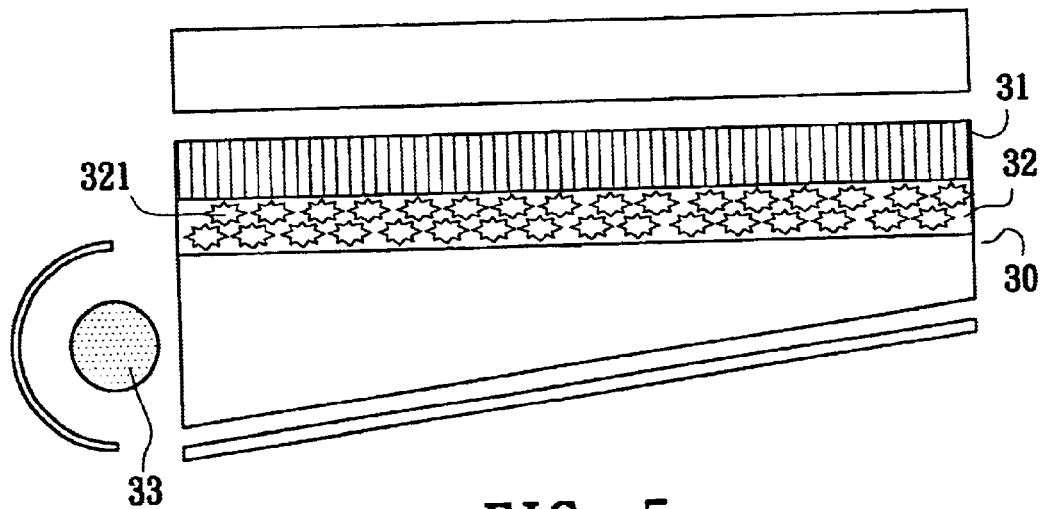
FIG. 5 is a sectional view of a second embodiment of the present invention.

FIG. 5 shows a second embodiment of the present invention, in which the topmost layer of the light guide 30 is the color-changing layer 31, while the bottom of the color-changing layer 31 is the brightening layer 32. The light beam emitted from the light source 33 is first focused by the brightening layer 32 and then goes to the color-changing layer 31. The light beam emitted from the external light source is reflected and scattered by the numerous optical particles 321 of the brightening layer 32 and then goes to the color-changing layer 31. The colors are mixed to form various colors and achieve enhanced brightness and evenness.

Figure 6:
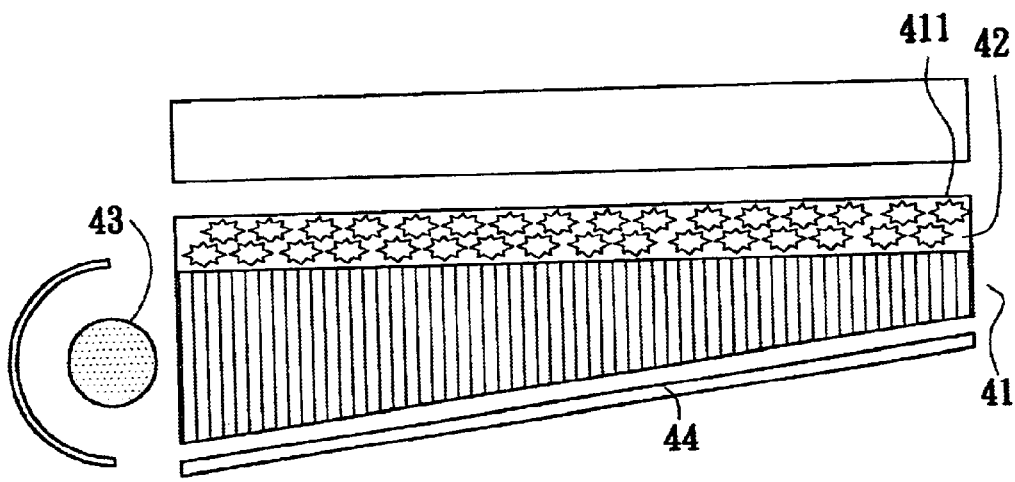
FIG. 6 is a sectional view of a third embodiment of the present invention.

FIG. 6 shows a third embodiment of the present invention, in which the light guide 41 is integrally blended with a color material or luminescent color material to directly form the color-changing layer. The bottom of the light outgoing face 411 of the light guide 41 is integrally formed with the brightening layer 42. Accordingly, the light beam emitted from the light source 43 has been already mixed into the light with changed color in the light guide 41. The light with changed color is then directly projected to the brightening layer 42 or is reflected by the reflecting layer 44 of the bottom of the light guide 41 thereto. The light is then focused to enhance the brightness. The light beam of the external light sources is also reflected and scattered by the brightening layer 42 to enhance the evenness of light.

The present invention is able to optically change the color of light and achieve desired back light color of the display in cooperation with the color of the light source. The conventional color-changing film will decrease the brightness of the back light, while the present invention is able to enhance the brightness. In structure, the cost for the scattering film and the color-changing film is saved.

In conclusion, the present invention has the following advantage:

1. The present invention is able to enhance the brightness. The brightening layer is disposed on the light guide. Numerous optical are blended or connected with the brightening layer. whereby the brightening layer is able to enhance the brightness of the light in perpendicular direction. Therefore, the entire brightness of the display is enhanced. The enhanced brightness is much higher than that of a conventional color-changing film.

2. The present invention is able to optically change the color of light. The color-changing layer if disposed on the light guide. The color-changing layer is blended or connected with predetermined color material or luminescent color material so as to change the color of light into a predetermined color and achieve various color of light. In the case of luminescent color material, the brightness will not be reduced due to interruption and absorption of the light. Reversely, a luminescent effect is achieved to enhance the brightness.

The above embodiments are only used to illustrate the present invention, not intended to limit the scope thereof. Many modification of the above embodiments can be made without departing from the spirit of the present invention.

What is claimed is:

1. A light guide of optically changing color of light, the light guide being disposed on a liquid crystal display having a liquid module, a lighting module being disposed under a bottom of the liquid crystal module, the lighting module having a light guide made of transparent substrate material, a top of the light guide having a light outgoing face, a bottom of the light guide having a emission face, a reflecting layer being disposed under the emission face, a light source being arranged on one side of the light guide, said light guide being characterized in that a brightening layer and a color-changing layer are integrally disposed under the light outgoing face of the light guide, the brightening layer having a number of optical particles, an outer surface of each optical particle being formed with multiple projections, the color-changing layer being blended with predetermined color material.

2. The light guide capable of optically changing color of light as claimed in claim 1, wherein the brightening layer is positioned between the emission face and the color-changing layer.

3. The light guide capable of optically changing color of light as claimed in claim 1, wherein color-changing layer is disposed under the bottom of the brightening layer.

4. The light guide capable of optically changing color of light as claimed in claim 1, wherein the color-changing layer is integrally formed in the light guide and the brightening layer is disposed on a top of the color-changing layer.

5. The light guide capable of optically changing color of light as claimed in claim 1, wherein the emission face of the light guide is an inclined face, the light guide being tapered to have a thick end and a thin end, a light incoming face being formed on a lateral side of the thick end of the light guide, a light source being arrange on one side of the light incoming face distal from the thin end of the light guide, an arched reflecting mirror being positioned on one side of the light source distal from the light guide.

* * * * *